(12) United States Patent
Lim et al.

(10) Patent No.: US 9,871,840 B2
(45) Date of Patent: Jan. 16, 2018

(54) ELECTRONIC APPARATUS AND METHOD FOR TRANSFERRING CONTENTS ON CLOUD SYSTEM TO DEVICE CONNECTED TO DLNA

(75) Inventors: Byung-Soo Lim, Yongin-si (KR); Jin-Hyoung Kim, Hwaseong-si (KR); Jin-Wook Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 123 days.

(21) Appl. No.: 13/601,897

(22) Filed: Aug. 31, 2012

(65) Prior Publication Data

US 2013/0054759 A1 Feb. 28, 2013

(30) Foreign Application Priority Data

Aug. 31, 2011 (KR) .................. 10-2011-0087933
Aug. 23, 2012 (KR) .................. 10-2012-0092648

(51) Int. Cl.
| | | |
|---|---|---|
| G06F 15/16 | (2006.01) | |
| H04L 29/06 | (2006.01) | |
| H04N 21/4402 | (2011.01) | |
| H04L 12/28 | (2006.01) | |
| H04N 21/235 | (2011.01) | |

(52) U.S. Cl.
CPC ...... H04L 65/4084 (2013.01); H04L 12/2812 (2013.01); H04L 12/2836 (2013.01); H04N 21/2353 (2013.01); H04N 21/4402 (2013.01)

(58) Field of Classification Search
CPC ................................ H04L 29/06476
USPC .................... 709/203, 219, 231
See application file for complete search history.

(56) References Cited

U.S. PATENT DOCUMENTS

| | | | |
|---|---|---|---|
| 7,844,707 B2 * | 11/2010 | Kothari ............... | H04L 67/2819 709/217 |
| 8,086,758 B1 * | 12/2011 | Allan ................ | G06F 9/541 370/352 |
| 8,762,480 B2 | 6/2014 | Park et al. | |
| 2006/0092938 A1 * | 5/2006 | Gentrix ................ | 370/390 |
| 2006/0114934 A1 * | 6/2006 | Shin et al. ............ | 370/466 |
| 2009/0150962 A1 | 6/2009 | Kim et al. | |
| 2010/0135279 A1 | 6/2010 | Petersson et al. | |

(Continued)

FOREIGN PATENT DOCUMENTS

| | | |
|---|---|---|
| CN | 101290624 A | 10/2008 |
| CN | 101867568 A | 10/2010 |

(Continued)

OTHER PUBLICATIONS

International Search Report dated Feb. 20, 2013 in connection with International Application No. PCT/KR2012/007005, 3 pages.
Written Opinion of the International Searching Authority dated Feb. 20, 2013 in connection with International Application No. PCT/KR2012/007005, 5 pages.

(Continued)

Primary Examiner — El Hadji Sall

(57) ABSTRACT

An electronic apparatus is capable of transferring contents on a cloud system to a device connected to a DLNA. In a method for operating a client on the cloud service system, a stream meta data table including information of one or more contents is received from a server. Meta data of contents selected from the contents are converted such that the meta data coincide with a format used by a device selected from one or more devices connected to a network. The selected contents are streamed from the server and transferred to the selected device.

14 Claims, 12 Drawing Sheets

(56) References Cited

U.S. PATENT DOCUMENTS

| | | |
|---|---|---|
| 2010/0268765 A1 | 10/2010 | Honjo |
| 2010/0312789 A1 | 12/2010 | Numakami |
| 2010/0325199 A1 | 12/2010 | Park et al. |
| 2011/0060841 A1 | 3/2011 | Bang et al. |
| 2011/0131518 A1 | 6/2011 | Ohashi |
| 2012/0304233 A1* | 11/2012 | Roberts et al. ............. 725/82 |

FOREIGN PATENT DOCUMENTS

| | | |
|---|---|---|
| CN | 101883128 | 11/2010 |
| CN | 101930449 | 12/2010 |
| CN | 102045399 | 5/2011 |
| JP | 2010521837 A | 6/2010 |
| JP | 2010282374 A | 12/2010 |
| JP | 2011118470 A | 6/2011 |
| KR | 10-2006-0063633 | 6/2006 |
| KR | 10-2006-0066385 | 6/2006 |
| KR | 10-2007-0048449 | 5/2007 |
| KR | 10-2007-0060990 | 6/2007 |
| KR | 10-2011-0026745 | 3/2011 |

OTHER PUBLICATIONS

Extended European Search Report in connection with European Application No. 12182428.8 dated Dec. 18, 2012, (6 pages).
Chinese Office Action issued for CN 2012800425693 dated Nov. 5, 2015, 12 pgs.
Japanese Patent Office "Notice of Preliminary Rejection," JP Application No. 2014-528287, Oct. 3, 2016, 8 pages, publisher JPO, Tokyo, Japan.
European Patent Office, "Communication pursuant to Article 94(3) EPC," EP Application No. 12182428.8, Nov. 23, 2016, 4 pages, publisher EPO, Rijswijk, Netherlands.
Chinese Office Action dated Jul. 8, 2016 in connection with Chinese Application No. 2012800425693, 10 pages.
Foreign Communication From a Related Counterpart Application, Chinese Application No. 201280042569.3, Text of the Third Office Action dated Feb. 4, 2017, 10 pages.
Foreign Communication from Related Counterpart Application; Japanese Patent Application No. JP2014-528287; Notice of Final Rejection dated Jul. 3, 2017; 9 pages.
Foreign Communication from Related Counterpart Application; Chinese Patent Application No. 201280042569.3; Text of the Fourth Office Action dated Aug. 22, 2017; 6 pages.

* cited by examiner

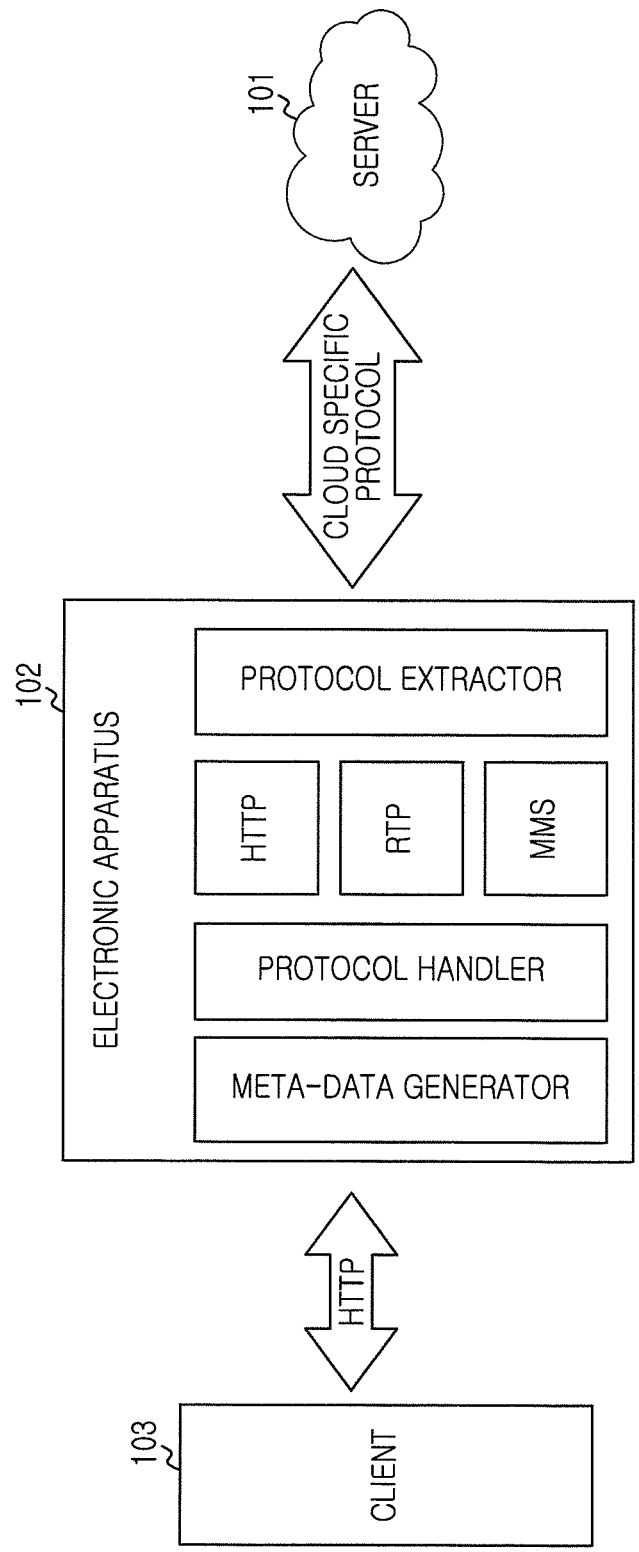

ELECTRONIC APPARATUS AND METHOD FOR TRANSFERRING CONTENTS ON CLOUD SYSTEM TO DEVICE CONNECTED TO DLNA

CROSS-REFERENCE TO RELATED APPLICATION(S) AND CLAIM OF PRIORITY

The present application is related to and claims the benefit under 35 U.S.C. §119(a) of a Korean patent applications filed in the Korean Intellectual Property Office on Aug. 31, 2011 and assigned Serial No. 10-2011-0087933, and Aug. 23, 2012 and assigned Serial No. 10-2012-0092648, the entire disclosure of which is hereby incorporated by reference.

TECHNICAL FIELD

The present application relates to a cloud system. A cloud service is an Internet based computing technology which is a service for providing data, utilities, and the like, stored in a server on the Internet to a client terminal such as a computer, a mobile phone, etc. when a user needs the data, utilities, etc.

BACKGROUND

A system for efficiently providing a resource of a cloud infrastructure can provide an elastic storage provision technique of dynamically extending a storage and using the same depending on various requirements without allowing a user to discriminate a local storage and various hetero types of storages and recognize them in a terminal possessed by the user. When receiving a file access request from an application, a client determines whether to process the file access request as a local file access request for a local storage or whether to process the file access request as a cloud file access request for a cloud storage connected to the Internet. A relay server receives a cloud file access request and supports to allow a client to use a cloud server.

The conventional cloud service has a two-tier structure playing a role of providing meta data of a cloud infrastructure resource, etc. via a relay server when a client accesses the resource of the cloud infrastructure. Accordingly, the conventional cloud service determines whether contents to be actually provided exist in a local storage or on a cloud and provides suitable contents. However, according to the above-described method, the relay server only determines a file access and cannot convert contents to a format suitable for a client.

SUMMARY

To address the above-discussed deficiencies of the prior art, it is a primary object to provide an apparatus and a method for allowing each client connected to a Digital Living Network Alliance (DLNA) to reproduce contents transferred from a cloud server.

Another aspect of the present disclosure is to provide an apparatus and a method for changing meta data provided on a cloud system such that the meta data coincides with a format of a client connected to a DNLA.

In accordance with an aspect of the present disclosure, a method for operating an electronic apparatus on a cloud service system is provided. The method includes receiving a stream meta data table including information of one or more contents from a server, converting meta data of contents selected from the contents such that the meta data coincides with a format used by a client selected from one or more clients connected to a network, and streaming the selected contents from the server to transfer the same to the selected client.

In certain embodiments, the method includes determining a kind of a protocol provided by the server, requesting the server to GET the determined protocol, receiving a response message of the determined protocol from the server, and requesting the server to transmit the stream meta data table.

In certain embodiments, the method includes determining meta data information of one or more contents provided by the server.

In certain embodiments, determining the meta data information of one or more contents provided by the server includes determining the meta data information of one or more contents by analyzing the received response message of the protocol or using an Application Program Interface (API) provided by a cloud.

In certain embodiments, the method includes determining accessibility of the selected client.

In certain embodiments, determining accessibility of the selected client includes transmitting a ProtocolInfo message to the selected client, and receiving a response signal to the ProtocolInfo message from the selected client.

In certain embodiments, the network is a Digital Living Network Alliance (DLNA).

In certain embodiments, converting the meta data of the contents selected from the contents such that the meta data coincides with the format used by the client selected from one or more clients connected via the network includes determining that one of the one or more contents has been selected, determining meta data of the selected contents among meta data information of the determined one or more contents, and converting, the determined meta data such that the meta data coincide with a format used by the selected client connected to a DLNA.

In certain embodiments, converting the determined meta data such that the meta data coincides with the format used by the selected client connected to the DLNA includes converting at least one of an Uniform Resource Identifier (URI), a type, a size, duration, and a thumbnail URI of contents among the determined meta data such that the meta data coincide with the format used by the selected client.

In certain embodiments, the method further includes converting a public Internet Protocol (IP) address, which is an address on a web browser where the one or more contents are post, to a private IP address, and transmitting the private IP URI including the converted IP address and the converted meta data to the selected client.

In certain embodiments, streaming the selected contents from the server to transfer the same to the selected client includes pushing the streamed contents from the server such that the streamed contents are reproduced by the selected client.

In certain embodiments, streaming the selected contents from the server to transfer the same to the selected client includes pulling the streamed contents from the server such that the streamed contents are reproduced by the selected client.

In accordance with another aspect of the present disclosure, a method for operating a client on a cloud service system is provided. The method includes receiving meta data coinciding with a format of a network in use from an electronic apparatus, and streaming arbitrary contents from the electronic apparatus.

In certain embodiments, the method further includes determining accessibility via the electronic apparatus.

In certain embodiments, determining accessibility via the electronic apparatus includes receiving ProtocolInfo message from the electronic apparatus, and transmitting a response signal to the ProtocolInfo message to the electronic apparatus.

In certain embodiments, receiving the meta data coinciding with the format of the network in use from the electronic apparatus includes receiving the meta data and a private URI of arbitrary contents together.

In certain embodiments, the network is a DLNA.

In accordance with still another aspect of the present disclosure, an electronic apparatus on a cloud service system is provided. The apparatus includes a protocol extractor configured to receive a stream meta data table including information of one or more contents from a server, a meta data generator configured to convert meta data of selected contents among the contents such that the selected contents coincide with a format used by a client selected among one or more clients connected to a network, and a DLNA Digital Media Controller (DMC) configured to stream the selected contents from the server to transfer the same to the selected client.

In certain embodiments, the protocol extractor is configured to determine a kind of a protocol provided by the server, request the server to GET the determined protocol, receive a response message of the determined protocol from the server, and request the server to transmit the stream meta data table.

In certain embodiments, the apparatus further includes a meta data generator configured to determine meta data information of the one or more contents provided by the server.

In certain embodiments, the meta data generator is configured to determine the meta data information of one or more contents by analyzing the received response message of the protocol or using an Application Program Interface (API) provided by a cloud.

In certain embodiments, the DLNA DMC is configured to determine accessibility of the selected client.

In certain embodiments, the DLNA DMC is configured to transmit a ProtocolInfo message to the selected client, and to receive a response signal to the ProtocolInfo message from the selected client.

In certain embodiments, the network is a Digital Living Network Alliance (DLNA).

In certain embodiments, the meta data generator is configured to determine that one of the one or more contents has been selected, determine meta data of the selected contents among meta data information of the determined one or more contents, and convert the determined meta data such that the meta data coincide with a format used by the selected client connected to a DLNA.

In certain embodiments, the meta data generator is configured to convert at least one of a Uniform Resource Identifier (URI), a type, a size, duration, and a thumbnail URI of contents among the determined meta data such that the meta data coincide with the format used by the selected client.

In certain embodiments, the meta data generator is configured to convert a public Internet Protocol (IP) address, which is an address on a web browser where the one or more contents are post, to a private IP address, and to transmit the private IP URI including the converted IP address and the converted meta data to the selected client.

In certain embodiments, the meta data generator is configured to push the streamed contents from the server such that the streamed contents are reproduced by the selected client.

In certain embodiments, the meta data generator is configured to pull the streamed contents from the server such that the streamed contents are reproduced by the selected client.

In accordance with further another aspect of the present disclosure, a client on a cloud service system is provided. The client includes a communication module configured to receive meta data coinciding with a format of a network in use from an electronic apparatus and streaming arbitrary contents from the electronic apparatus, and a controller configured to control an overall operation.

In certain embodiments, the communication module is configured to determine accessibility via the electronic apparatus.

In certain embodiments, the communication module is configured to receive a ProtocolInfo message from the electronic apparatus and to transmit a response signal to the ProtocolInfo message to the electronic apparatus.

In certain embodiments, the communication module is configured to receive the meta data and a private URI of the arbitrary contents together.

In certain embodiments, the network is a DLNA.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates a client that transfers contents on a cloud system to a device connected to a DLNA on the whole according to embodiments of the present disclosure;

Throughout the drawings, like reference numerals will be understood to refer to like parts, components and structures.

DETAILED DESCRIPTION

Figure 2A:
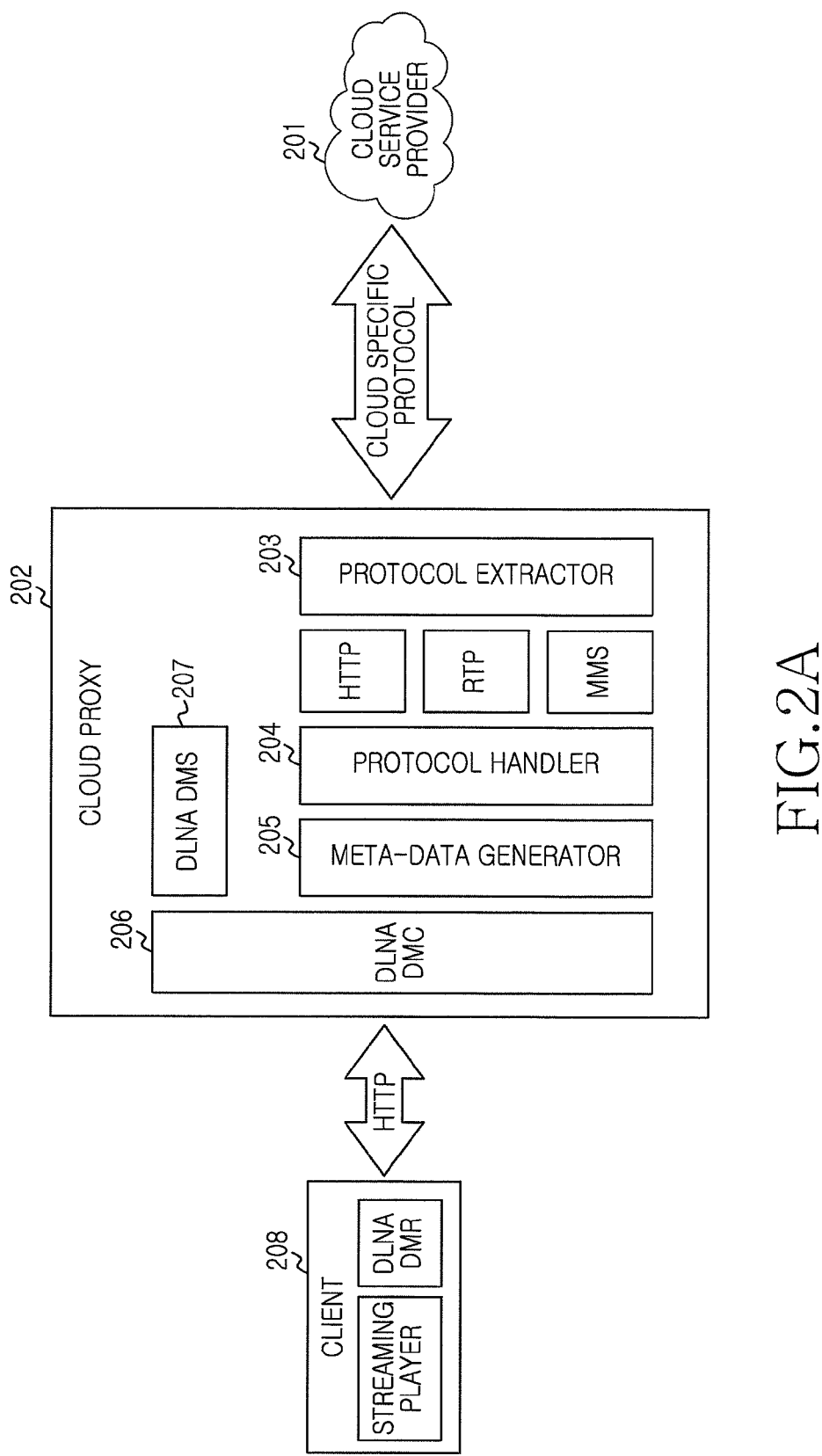
FIGS. 2A through 2C illustrate streaming contents from a server on a cloud system and transmitting the contents to a client according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. The following description with reference to the accompanying drawings is provided to assist in a comprehensive understanding of exemplary embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents.

FIG. 1 illustrates a client configured to transfer contents on a cloud system to a device connected to a DLNA on the whole according to embodiments of the present disclosure. As illustrated in FIG. 1, a system includes a server 101 on a cloud system, an electronic apparatus 102, and a client 103. Here, a cloud service can be defined as a service allowing a client connected with a server to download and use contents stored in the server. In other words, the cloud service is a computing service allowing a client to borrow a computing resource of a hardware, a software, and the like, existing in an intangible form such as a cloud as much as necessary and pay a fee for using it. The cloud service denotes a technology for integrating computing resources existing on different physical locations using a virtualization technology and providing the same. For example, a client using a cloud service connects to a server to download and display contents desired by the client without limitation of time and space even when a large capacity of contents is not stored in the client.

The server 101 on the cloud system transmits stored content to the electronic apparatus 102. More specifically, the server 101 can be requested by the electronic apparatus 102 to stream specific content and transmit the relevant content to the electronic apparatus 102. A method for operating the server according to the present disclosure is described below in detail. First, the server 101 performs communication with the electronic apparatus 102 using a protocol provided on a relevant cloud system. The server 101 can be requested by the electronic apparatus 102 to GET a protocol and transmit a response message of the protocol to the electronic apparatus 102. The cloud server 101 that has transmitted the response message of the protocol to the electronic apparatus 102 can be requested by the electronic apparatus 102 to transmit a stream meta data table including information of at least one contents and transmit the requested stream meta data table to the electronic apparatus 102. After that, the server 101 can be requested by the electronic apparatus 102 to transmit one of one or more contents streams and transmit the requested contents to the electronic apparatus 102.

The electronic apparatus 102 of the cloud system receives a stream meta data table including information of at least one contents from the server 101. More specifically, the electronic apparatus 102 determines a kind of a protocol provided from the server 101, requests the server 101 to GET the determined protocol, and receives a response message of the determined protocol from the server 101. Here, the electronic apparatus 102 determines meta data information of content provided by the server 101. More specifically, the electronic apparatus 102 determines meta data information of at least one contents by analyzing the response message of the protocol received from the server 101 or using an Application Program Interface (API) provided by a cloud. Thereafter, the electronic apparatus 102 requests the server 101 to transmit a stream meta data table and receives the stream meta data table from the server 101. More specifically, the electronic apparatus 102 requests that the server 101 transmit the stream meta data table including information of at least one contents and receives the requested stream meta data table from the server 101.

Thereafter, the electronic apparatus 102 determines accessibility of a selected client. More specifically, the electronic apparatus 102 transmits a ProtocolInfo message to the client 103 selected by a user and receives a response signal to the ProtocolInfo message from the selected client 103. Here, the electronic apparatus 102 determines the accessibility of the selected client 103 in order to determine how meta data information should be sent to the relevant client 103. That is, since the electronic apparatus 102 according to the present disclosure performs a relay function for converting meta data of specific contents streamed from the server 101 such that the meta data coincides with a format of a DLNA used by the selected client 103, the electronic apparatus 102 determines the accessibility of the selected client 103 with priority. Here, the DLNA is a new official cooperation which will lead global home network commercialization and is newly changed from Digital Home Working Group (DHWG) established on June, 2003. The DLNA can be defined as a system for connecting information home appliances such as a Personal Computer (PC) in a household via a wired or wireless network to enable Internet and data sharing, sharing and mutual control of peripheral devices such as a scanner, a printer, and the like, and remotely controlling home appliances such as a TV, a refrigerator, an air conditioner, a DVD player, a digital camera, and the like, freely anytime any where by cooperating with an external network using the Internet or a portable information terminal.

Thereafter, the electronic apparatus 102 converts meta data of content selected among one or more contents such that the meta data coincides with a format used by the client 103 selected among one or more clients connected to a network. That is, the electronic apparatus 102 converts the meta data of one contents selected by a user among one or more contents such that the meta data coincides with the format used by the selected client 103 among the one or more clients connected to a DLNA. More specifically, the electronic apparatus 102 determines that one of the contents has been selected, and determines meta data of the selected contents among meta data of the determined contents to convert the determined meta data such that the meta data coincides with the format used by the selected client 103 connected to the DLNA. Here, the electronic apparatus 102 converts at least one of a Uniform Resource Identifier (URI), a type, a size, duration, a thumbnail URI of contents among the determined meta data such that the meta data coincides with the format used by the selected client. Thereafter, the electronic apparatus 102 converts a public IP address, which is an address on a web browser where one or more contents have been post, to a private IP address, and transmits a private URI including the converted IP address and converted meta data to the selected client. Thereafter, the electronic apparatus 102 streams the contents selected from the server 101 to transfer the same to the client 103. More specifically, the electronic apparatus 102 pushes or pulls the contents so that the contents streamed from the server 101 can be reproduced by the selected client 103.

The client 103 on the cloud system determines accessibility via the electronic apparatus 102. More specifically, the client 103 receives a ProtocolInfo message from the electronic apparatus 102 and transmits a response signal to the ProtocolInfo message to the electronic apparatus 102. Here, the electronic apparatus 102 determines the accessibility of the selected client 103 in order to determine how meta data information should be sent to the relevant client 103. That is, since the electronic apparatus 102 according to the present disclosure performs a relay function for converting meta data of specific contents streamed from the server 101 such that the meta data coincides with a format of a DLNA used by the selected client 103, the electronic apparatus 102 determines the accessibility of the selected client 103 with priority. Thereafter, the client 103 receives meta data coinciding with the format of the network in use from the electronic apparatus 102 to stream arbitrary contents. More specifically, the client 103 receives meta data coinciding with the format of the DLNA in use and a private URI of contents together from the electronic apparatus 102 to stream the arbitrary contents.

Figure 2B:
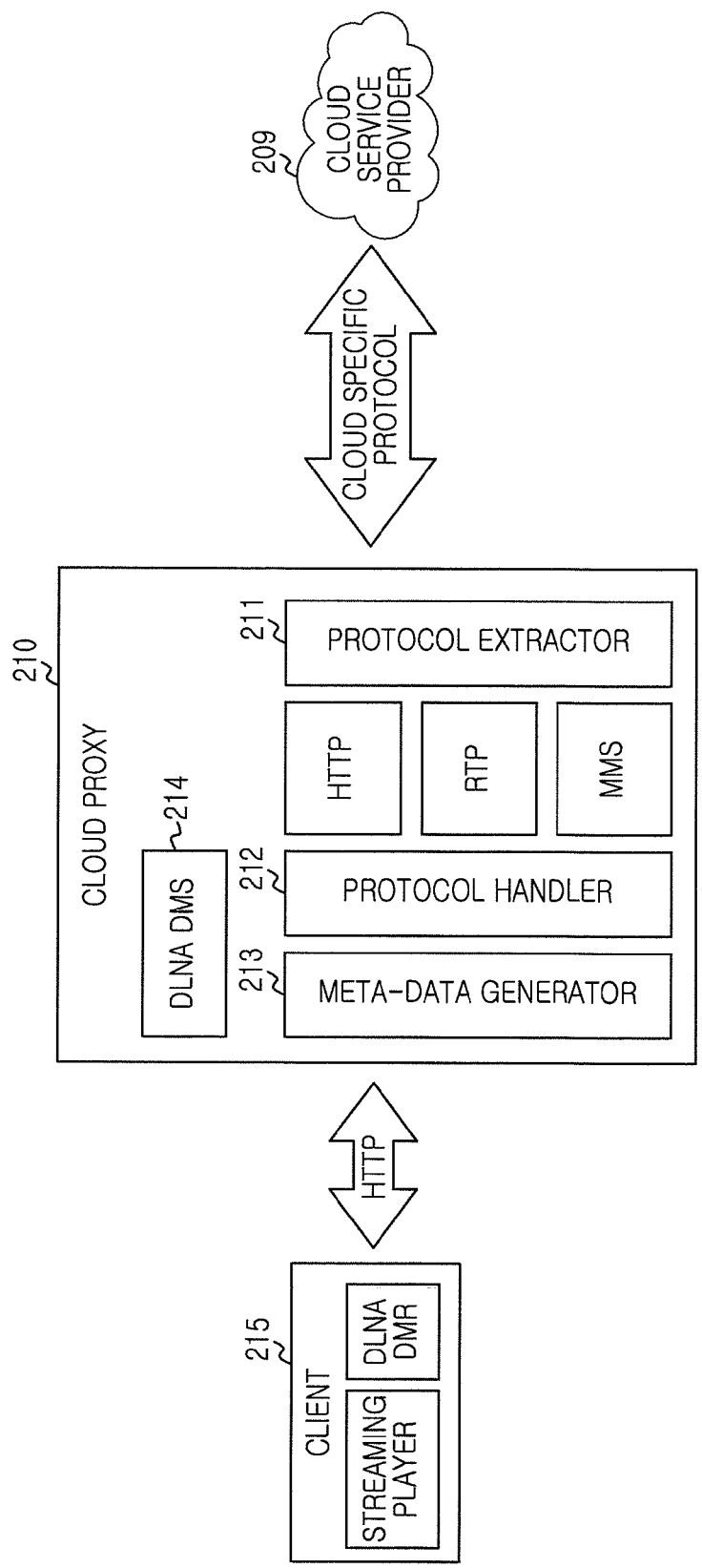

FIGS. 2A and 2B illustrate streaming contents from a server on a cloud system and transmitting the contents to a client according to embodiments of the present disclosure. FIG. 2A illustrates streaming contents from a server on a cloud system and pushing, the same to a client according to embodiments of the present disclosure. First, as illustrated in FIG. 2A, a cloud proxy 202 includes a protocol extractor 203, a protocol handler 204, a meta data generator 205, a DLNA DMC 206, and a DLNA DMS 207. The protocol extractor 203 analyzes a protocol provided by a cloud service provider 201 to determine what kind of a protocol is provided by the relevant cloud service provider. For example, when protocols provided by the cloud service provider 201 are a Hyper Text Transfer Protocol (HTTP), a Real-Time Transfer Protocol (RTP), and a Multimedia Messaging Service (MMS), the protocol extractor 203 determines that the protocols provided by the cloud service provider 201 are the HTTP, the RTP, and the MMS. The protocol handler 204 receives a protocol analyzed by the protocol extractor 203 from the protocol extractor 203 and transfers the same to the meta data generator 205. For example, when the protocol analyzed by the protocol extractor 203 is the HTTP, the protocol handler 204 receives an HTTP protocol from the protocol extractor 203 to transfer the same to the meta data generator 205. The meta data generator 205 extracts information basically required for a streaming player (client 208) to reproduce selected contents using protocol information obtained via the protocol handler 204. The DLNA DMC 206 is a device for pushing or controlling contents possessed by a DMC in the DLNA. The DLNA DMS 207 serves as a server having contents in the DLNA. More specifically, the DLNA DMS 207 does not substantially store contents streamed from the cloud service provider 201 but operates as if it stored the contents to stream relevant contents using the client 208. A DLNA Digital Media Renderer (DMR) provided to the client 208 reproduces contents of the DMS. The present embodiment illustrates the cloud proxy 202 pushes specific contents to the client 208. More specifically, the cloud proxy 202 transmits an instruction to play specific contents to a client. Thereafter, the DLNA DMR provided to the client 208 reproduce contents of the DMS.

FIG. 2B illustrates pulling contents streamed from a server on a cloud system to a client according to embodiments of the present disclosure. First, as illustrated in FIG. 2B, a cloud proxy 210 includes a protocol extractor 211, a protocol handler 212, a meta data generator 213, and a DLNA DMS 214. The protocol extractor 211 analyzes protocols provided by a cloud service provider 209 to determine what kind of a protocol is provided from the relevant cloud service provider 209. For example, in the case where protocols provided by the cloud service provider 209 are a Hyper Text Transfer Protocol (HTTP), a Real-Time Transfer Protocol (RTP), and a Multimedia Messaging Service (MMS), the protocol extractor 211 determines that the protocols provided by the cloud service provider 209 are the HTTP, the RTP, and the MMS. The protocol handler 212 receives a protocol analyzed by the protocol extractor 211 from the protocol extractor 211 and transfers the same to the meta data generator 213. For example, in the case where the protocol analyzed by the protocol extractor 211 is the RTP, the protocol handler 212 receives the RTP protocol from the protocol extractor 211 to transfer the same to the meta data generator 213. The meta data generator 213 extracts information basically required for a streaming player (client 215) to reproduce selected contents using protocol information obtained via the protocol handler 212. A DLNA DMS 214 serves as a server having contents. More specifically, the DLNA DMS 214 does not substantially store contents streamed from the cloud service provider 209 but operates as if it stored the contents to stream relevant contents using the client 215. A DLNA Digital Media Renderer (DMR) provided to the client 215 reproduces contents of the DMS. The present embodiment illustrates that the cloud proxy 210 pulls specific contents to the client 215. More specifically, the cloud proxy 210 receives an instruction to play specific contents from the client 215 to allow the DLNA DMR provided to the client 215 to reproduce contents of the DMS.

Figure 2C:
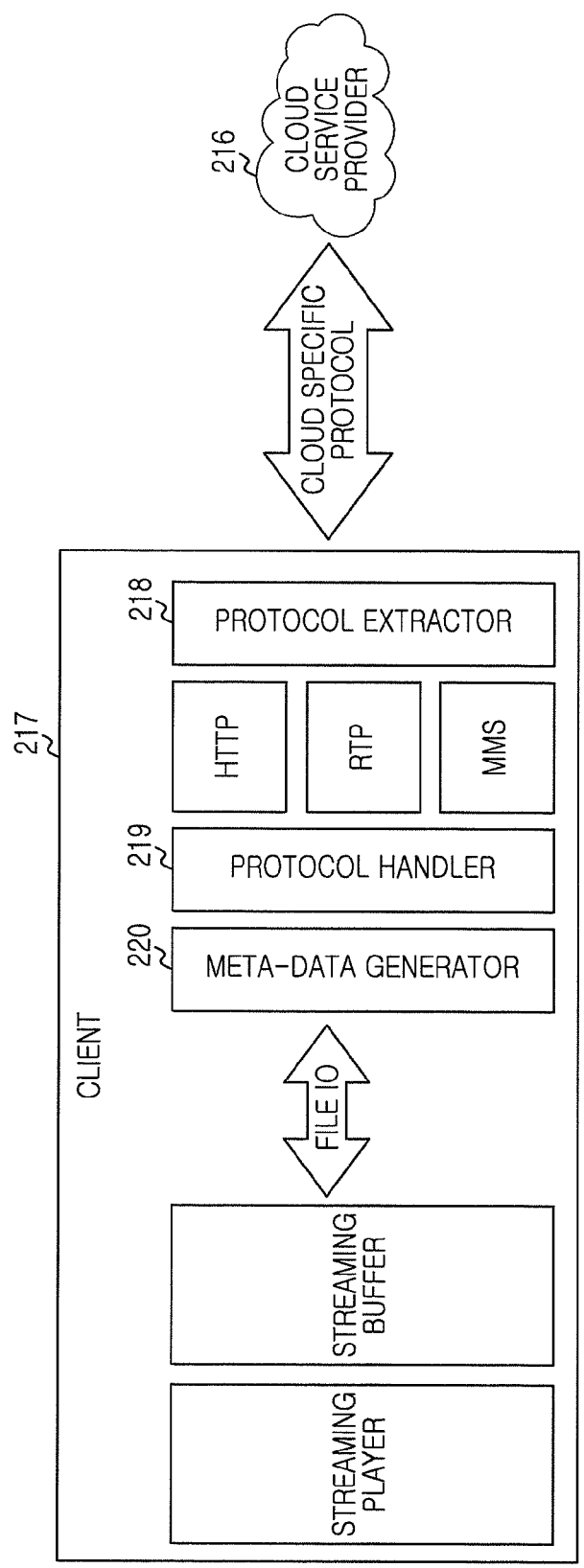

FIG. 2C illustrates streaming contents from a server when a cloud proxy is located at a local device according to embodiments of the present disclosure. First, as illustrated in HG. 2C, the cloud proxy is located at a local device (client 217). The client 217 includes a protocol extractor 218, a protocol handler 219, a meta data generator 220, a streaming buffer, and a streaming player. According to the present embodiment, in when the cloud proxy is located at the local device, an HTTP stream is directly provided to a buffer of the streaming player, so that the local device receives a cloud service from a cloud service provider 216.

Figure 3A:
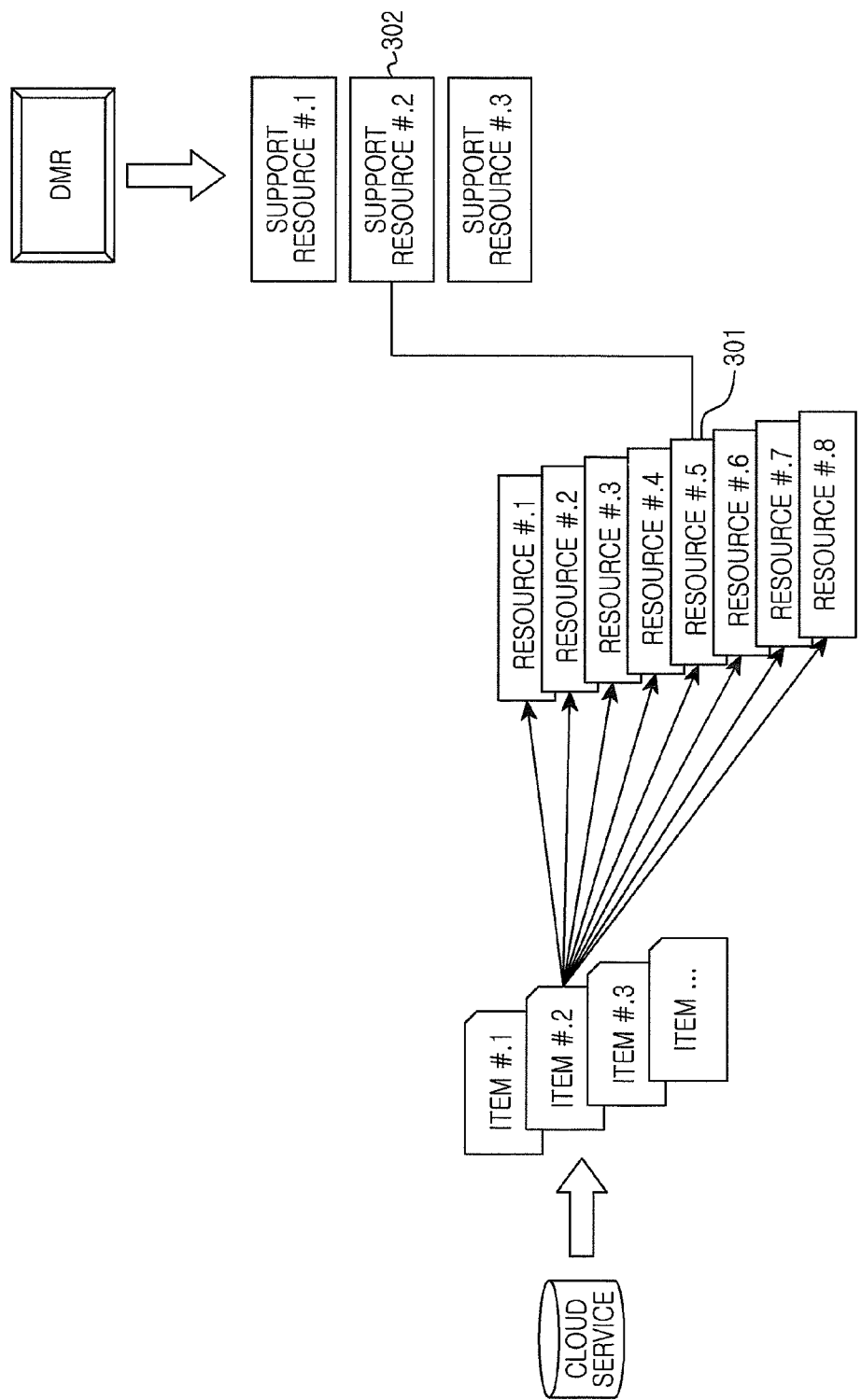
FIGS. 3A through 3C illustrate mapping of a media protocol and mapping of cloud contents according to embodiments of the present disclosure.
Figure 3B:
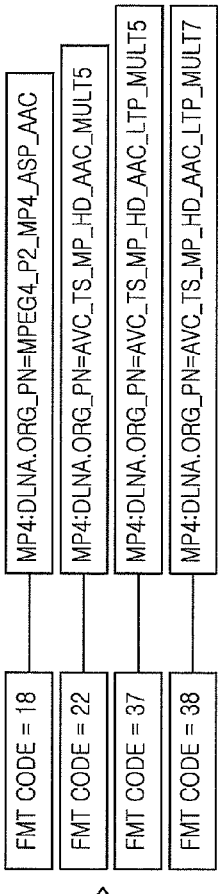
Figure 3C:
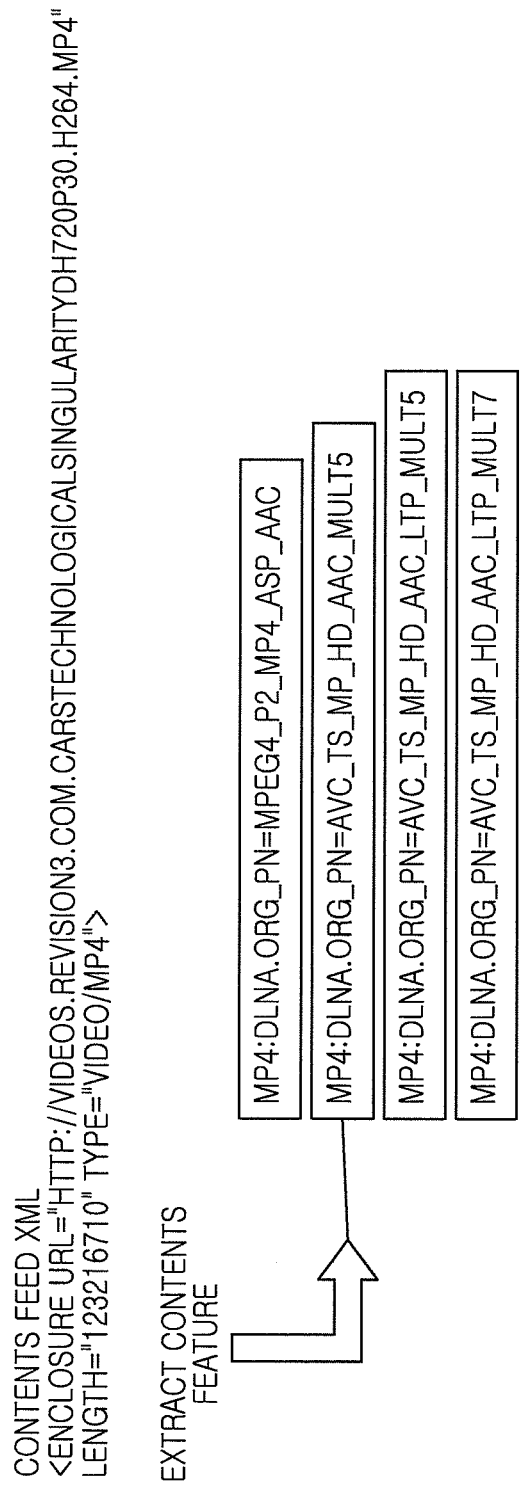
Figure 4:
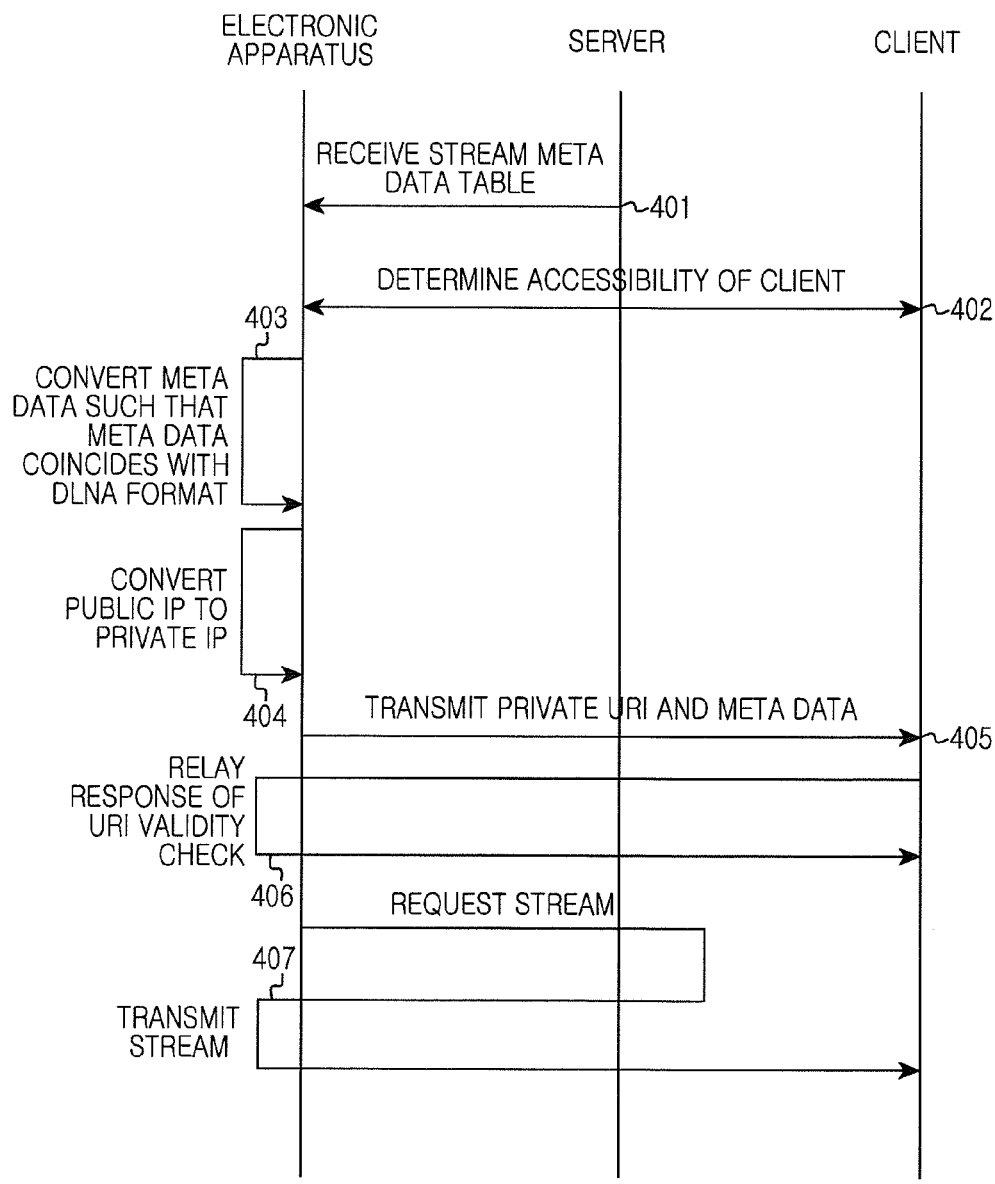
FIG. 4 illustrates a method for operating a server, an electronic apparatus, and a client according to embodiments of the present disclosure.

FIGS. 3A through 3C illustrate mapping of a media protocol and mapping of cloud contents according to embodiments of the present disclosure. FIG. 3A illustrates mapping of a media protocol according to embodiments of the present disclosure. According to the present disclosure, a cloud proxy matches resource information of an item that a user desires to play with protocol information of a DMR to make a common matching list, and brings a first priority protocol list of the DMR. For example, the cloud proxy generates eight resources corresponding to a contents item 2, and then retrieves three resources which are resources supported by the DMR. As a result, the cloud proxy determines that a resource #5 301 generated by the proxy is mapped to a resource #3 302 supported by the DMR. Also, the cloud proxy converts an external public IP to a private IP and have a relay server for checking validity of the DMR. This server adds a DLNA to an HTTP head instruction of Reverse-NAT and the DMR and respond.

FIG. 3B illustrates mapping of cloud contents according to embodiments of the present disclosure and FIG. 3C illustrates mapping of cloud contents according to embodiments of the present disclosure. First, methods for generating meta data at a meta data generator of a cloud proxy according to the present disclosure can be roughly classified into two. The embodiment illustrated in FIG. 3B represents a case of not processing an individual item using an individual URI in a cloud service and providing a table via a data API or a HTTP request. For example, fmt code=18 represents that a contents type of a DNLA has been converted to mp4:DLNA.ORG-PN=MPEG4-P2-MP4-ASP-AAC when a fmt (format) code is 18. That is, the present disclosure illustrates a meta data converting method, and more specifically, an information converting method of a codec. FIG. 3C illustrates when an individual URI is provided for each individual contents according to an embodiment of the present disclosure. More specifically, as illustrated in FIG. 3B, the present embodiment illustrates an example of not converting meta data using a table provided via a data API or an HTTP request but providing an individual URI for each individual contents. For example, the present embodiment illustrates an example of extracting a contents feature individually to represent that a contents type of a DNLA has been converted to mp4:DLNA.ORG-PN=AVC-TS-MP-HD-AAC-MULT5.

FIG. illustrates a method for operating a server, an electronic apparatus, and a client according to embodiments of the present disclosure. First, the electronic apparatus receives a stream meta data table including one or more contents from the server (step 401). More specifically, the electronic apparatus determines a kind of a protocol provided by the server, request the server to GET the determined protocol, and receives a response message of the determined protocol. Thereafter, the electronic apparatus requests the server to transmit a meta data table and receive a stream meta data table from the server. More specifically, the electronic apparatus requests that the server transmit a stream meta data table including information of one or more contents and receives the stream meta data table from the server. Here, the electronic apparatus determines meta data information of one or more contents provided by the server. More specifically, the electronic apparatus determines information regarding meta data of one or more contents by analyzing a response message of a protocol received from the server or using an API provided by a cloud.

The electronic apparatus that has received the stream meta data table determines accessibility of a selected client (step 402). More specifically, the electronic apparatus transmits a ProtocolInfo message to the client selected by a user and receives a response signal to the ProtocolInfo message from the selected client. Here, the electronic apparatus determines the accessibility of the selected client in order to determine how meta data information should be sent to the relevant client. That is, since the electronic apparatus according, to the present disclosure performs a relay function for converting meta data of specific contents streamed from the server such that the meta data coincides with a format of a DLNA used by the selected client, the electronic apparatus determines the accessibility of the selected client 103 with priority.

Thereafter, the electronic apparatus converts meta data of contents selected among one or more contents such that the meta data coincide with a format used by the client selected among one or more clients connected to a network (step 403). That is, the electronic apparatus converts the meta data of one contents selected by a user among one or more contents such that the meta data coincides with the format used by the selected client among the one or more clients connected to a DLNA. More specifically, the electronic apparatus determines that one of the contents has been selected, and determines meta data of selected contents among meta data of the determined contents to convert the determined meta data such that the meta data coincides with a format used by the selected client connected to the DLNA. Here, the electronic apparatus converts at least one of a Uniform Resource Identifier (URI), a type, a size, duration, a thumbnail URI of contents among the determined meta data such that the meta data coincides with the format used by the selected client.

Thereafter, the electronic apparatus converts a public IP to a private IP (step 404). More specifically, the electronic apparatus converts a public IP address, which is an address on a web browser where one or more contents have been post, to a private IP address.

The electronic apparatus that has converted the public IP to the private IP transmits a private URI and converted meta data to a client (step 405). More specifically, the electronic apparatus transmits the private URI including the converted IP address and the converted meta data to the client under a user's control. That is, the electronic apparatus transmits meta data where at least one of a URI, a type, a size, duration, and a thumbnail URI of contents among determined meta data has been converted such that the meta data coincide with a format used by the client together with the private URI.

Thereafter, the electronic apparatus relay-responds to check regarding URI validity from the client (step 406). That is, when the client requests the electronic apparatus to check URI validity in order to check the validity of the private URI transmitted from the electronic apparatus, the electronic apparatus relay-responds to the check regarding the URI validity.

Finally, the electronic apparatus streams content selected by the server and transfers the same to the client (step 407).

More specifically, the electronic apparatus pushes or pulls the contents streamed from the server so that the contents can be reproduced at the selected client.

Figure 5:
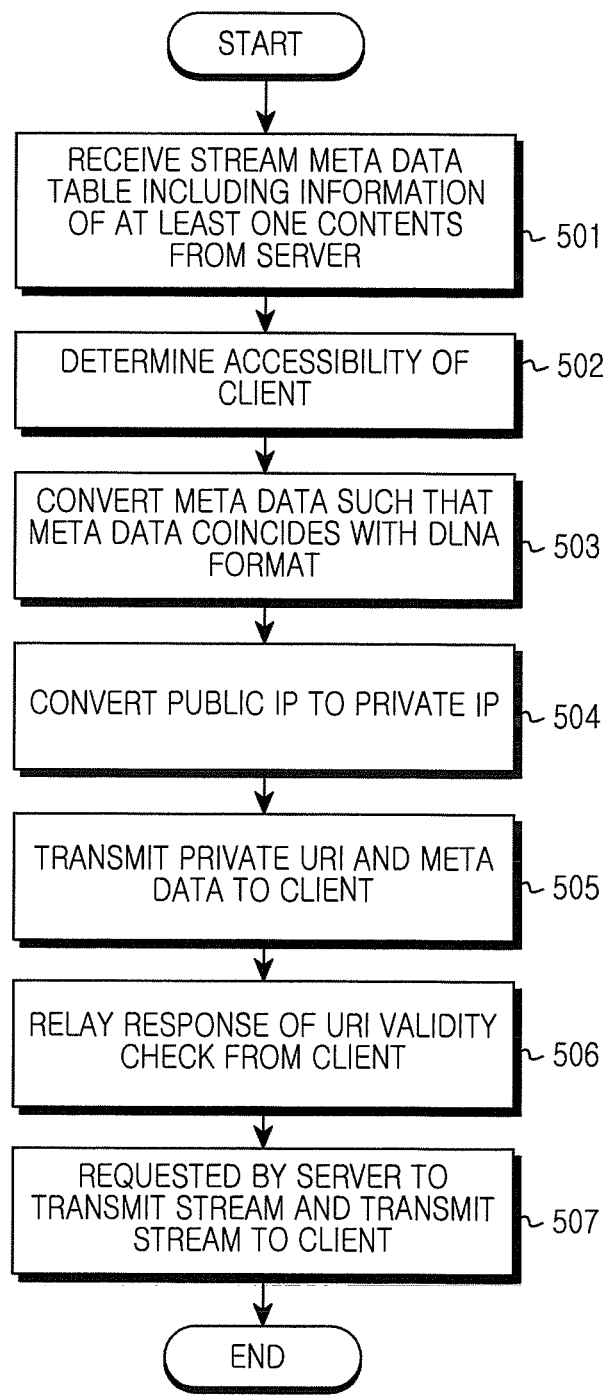
FIG. 5 illustrates a method for operating an electronic apparatus according to embodiments of the present disclosure.

FIG. 5 illustrates a method for operating an electronic apparatus according to embodiments of the present disclosure. First, as illustrated in FIG. 5, the electronic apparatus receives a stream meta data table including information of one or more contents from the server (step 501). More specifically, the electronic apparatus determines a kind of a protocol provided by the server, requests the server to GET the determined protocol, and receives a response message of the determined protocol from the server. Thereafter, the electronic apparatus requests that the server transmit a stream meta data table and receive the stream meta data table from the server. More specifically, the electronic apparatus requests that the server transmit the stream meta data table including information of one or more contents and receive the stream meta data table from the server.

The electronic apparatus that has received the stream meta data table including information of one or more contents from the server determines accessibility of the selected client (step 502). More specifically, the electronic apparatus transmits a ProtocolInfo message to the client selected by a user and receive a response signal to the ProtocolInfo message from the selected client. Here, the electronic apparatus determines the accessibility of the selected client in order to determine how meta data information should be sent to the relevant client. That is, since the electronic apparatus according to the present disclosure performs a relay function for converting meta data of specific contents streamed from the server such that the meta data coincide with a format of a DLNA used by the selected client, the electronic apparatus determines the accessibility of the selected client with priority.

The electronic apparatus that has determined the accessibility of the client converts meta data of contents selected among one or more contents such that the meta data coincides with a format used by the client selected among one or more clients connected to a network (step 503). That is, the electronic apparatus converts the meta data of one contents selected by a user among one or more contents such that the meta data coincides with the format used by the selected client among the one or more clients connected to a DLNA. More specifically, the electronic apparatus determines that one of the contents has been selected, and determines meta data of selected contents among meta data of the determined contents to convert the determined meta data such that the meta data coincides with the format used by the selected client connected to the DLNA. Here, the electronic apparatus converts at least one of a Uniform Resource Identifier (URI), a type, a size, duration, a thumbnail URI of contents among the determined meta data such that the meta data coincides with the format used by the selected client.

Thereafter, the electronic apparatus converts a public IP address, which is an address on a web browser where one or more contents have been post, to a private IP address (step 504).

The electronic apparatus that has converted the public IP to the private IP transmits a private URI and meta data to the client (505). More specifically, the electronic apparatus transmits the private URI including the converted IP address and the converted meta data to the client under a user's control. That is, the electronic apparatus transmits meta data where at least one of a URI, a type, a size, duration, and a thumbnail URI of contents among determined meta data has been converted such that the meta data coincides with a format used by the client together with the private URI.

After that, the electronic apparatus relay-responds to check regarding URI validity from the client (506). That is, when the client requests the electronic apparatus to check URI validity in order to check the validity of the private URI transmitted from the electronic apparatus, the electronic apparatus relay-responds to the check regarding the URI validity.

The electronic apparatus that has relay-responded to the URI validity check from the client streams contents selected from the server and transfers the same to the client (step 507). More specifically, the electronic apparatus pushes or pulls the contents streamed from the server so that the contents can be reproduced at the selected client.

Figure 6:
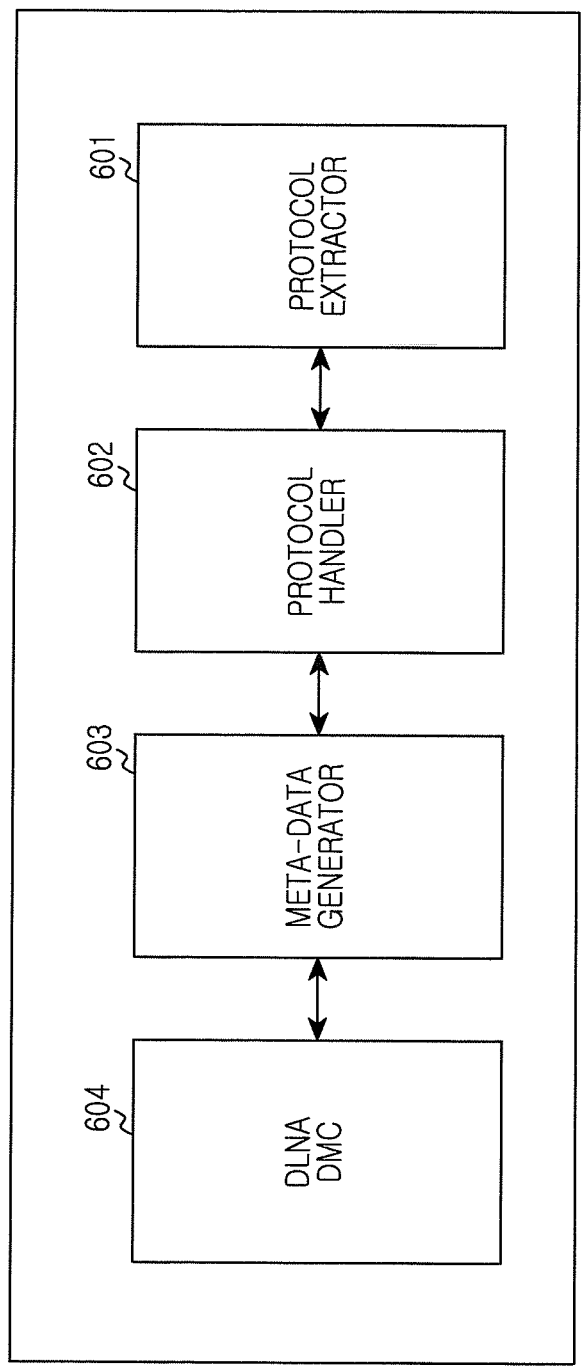
FIG. 6 illustrates an electronic apparatus according to embodiments of the present disclosure.

FIG. 6 illustrates an electronic apparatus according to embodiments of the present disclosure. As illustrated in FIG. 6, the electronic apparatus includes a protocol extractor 601, a protocol handler 602, a meta data generator 603, and a DLNA DMC 604.

First, the protocol extractor 601 analyzes a protocol provided by a cloud service provider (server) to determine what kind of a protocol is provided by the relevant cloud service provider. For example, the protocol extractor 601 receives a stream meta data table including information of one or more contents from the server. Also, the protocol extractor 601 determines a kind of a protocol provided by the server, requests the server to GET the determined protocol, receives a response message of the protocol determined by the server, and requests the server to transmit the stream meta data table.

The protocol handler 602 receives the protocol analyzed by the protocol extractor 601 from the protocol extractor 601 and transfers the same to the meta data generator 603.

The meta data generator 603 extracts information basically required for a streaming player (client) to reproduce selected contents using protocol information obtained via the protocol handler 602. For example, the meta data generator 603 converts meta data of content selected among contents such that the meta data coincides with a format used by a client selected among one or more clients connected to a network. Also, the meta data generator 603 determines meta data information of one or more contents provided by the server, and determines information regarding meta data of one or more contents by analyzing a response message of the received protocol or using an API provided by a cloud. Also, the meta data generator 603 determines that one content among one or more contents have been selected, determines meta data of selected contents among meta data information of the determined one or more contents, and converts the determined meta data such that the meta data coincide with a format used by the selected client connected to a DLNA. Also, the meta data generator 603 converts at least one of a URI, a type, a size, duration, and a thumbnail URI of contents among the determined meta data such that the meta data coincide with a format used by the selected client. Also, the meta data generator 603 converts a public IP address, which is an address on a web browser where one or more contents have been post, to a private IP address, and transmits a private URI including the converted IP address and converted meta data to the selected client. Also, the meta data generator 603 pushes and pulls the contents streamed from the server so that the contents are reproduced at the selected client.

The DLNA DMC 604 streams contents selected from the server, transfers the same to the selected client, and determines accessibility of the selected client. Also, the DLNA DMC 604 transmits a ProtocolInfo message to the selected client and receives a response signal to the ProtocolInfo message from the selected client.

Figure 7:
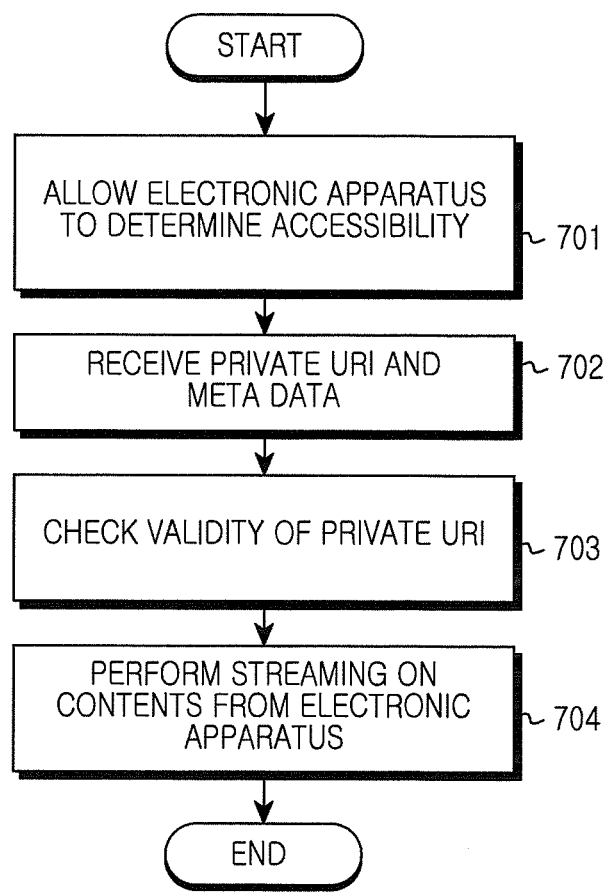
FIG. 7 illustrates a method for operating a client according to embodiments of the present disclosure.

FIG. 7 illustrates a method for operating a client according to embodiments of the present disclosure. First, as illustrated in FIG. 7, the client determines accessibility via an electronic apparatus (step 701). More specifically, the client receives a ProtocolInfo message from the electronic apparatus, and transmits a response signal to the ProtocolInfo message to the electronic apparatus. Here, the electronic apparatus determines the accessibility of the selected client in order to determine how meta data information should be sent to the relevant client. That is, since the electronic apparatus according to the present disclosure performs a relay function for converting meta data of specific contents streamed from the server such that the meta data coincide with a format of a DLNA used by the selected client, the electronic apparatus determines the accessibility of the selected client with priority.

The client that has determined the accessibility via the electronic apparatus receives a private URI and meta data from the electronic apparatus (step 702). More specifically, the client receives meta data coinciding with the format of the DLNA in use and the private URI of contents together from the electronic apparatus. That is, since the electronic apparatus has determined accessibility of the client in the preceding process 701, the electronic apparatus determines how meta data should be sent to the client. Therefore, the client receives meta data coinciding with the format of the DLNA from the electronic apparatus.

Thereafter, the client checks validity of a private URI (step 703). More specifically, when the client requests the electronic apparatus to check URI validity in order to check the validity of a private URI transmitted from the electronic apparatus, the client relay-receives a response to the check regarding the URI validity from the electronic apparatus.

The client that has checked the validity of the private URI streams contents from the electronic apparatus (step 704). More specifically, the client 103 receives meta data coinciding with the format of the DLNA in use and the private URI of contents together from the electronic apparatus 102 to stream arbitrary contents.

Figure 8:
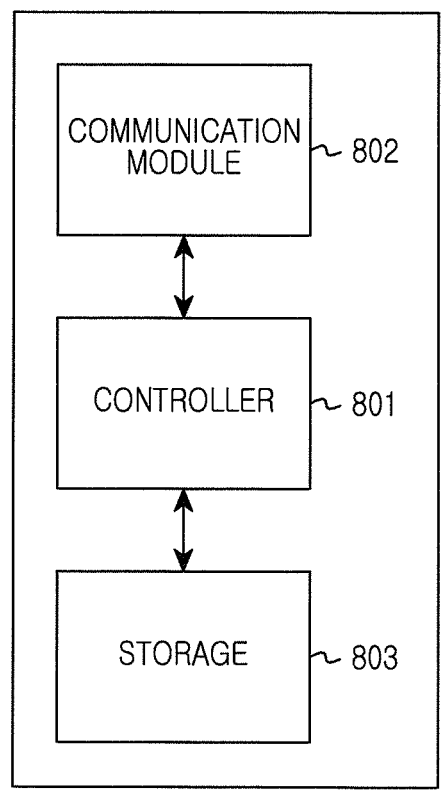
FIG. 8 illustrates a client according to embodiments of the present disclosure.

FIG. 8 illustrates a client according to embodiments of the present disclosure. As illustrated in FIG. 8, the client includes a controller 801, a communication module 802, and a storage 803.

The controller 801 controls an overall operation of the client.

For voice and data communication, the communication module 802 processes a signal transmitted/received via an antenna. For example, the communication module 802 receives meta data coinciding with the format of a network in use from an electronic apparatus, and streams arbitrary content from the electronic apparatus. Also, the communication module 802 determines accessibility via the electronic apparatus. Also, the communication module 802 receives a ProtocolInfo message from the electronic apparatus, transmits a response signal to the ProtocolInfo message to the electronic apparatus, and receives a private URI of arbitrary contents together.

The storage 803 includes a program storage for storing a program for controlling an operation of the client and a data storage for storing data occurring during execution of a program.

In the above block configuration, the controller 801 performs an overall function of the client. Separate configuration and illustration of the controller 801 in an exemplary embodiment of the present disclosure is for separately describing each function. Therefore, in actual realization of a product, all or some of the functions of the client can be processed by the controller 801.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

According to an electronic apparatus and a method thereof for transferring contents on a cloud system to a device connected to a DLNA, respective clients connected to the DLNA can reproduce contents received from a cloud server.

What is claimed is:

1. A method to operate an electronic apparatus connected to a plurality of clients on a cloud service system, the method comprising:
   determining a kind of a protocol provided by a server;
   requesting the server to retrieve the protocol;
   receiving a response message of the protocol from the server; and
   requesting the server to transmit metadata comprising information on the one or more contents included in the server;
   receiving, from the server, the metadata comprising the information on the one or more contents included in the server;
   selecting, among the plurality of clients, a client which is to reproduce a selected content among the one or more contents;
   in response to selecting the client, determining a usable format of the metadata by the selected client;
   converting, to the determined usable format, a format of the received metadata of the selected content, wherein converting the format of the received metadata of the selected content to the determined usable format includes:
      converting the format of the metadata of the selected content to the determined usable format;
      transmitting, to the selected client, the metadata of the selected content with the converted format, the metadata being to be used to reproduce the selected content by the selected client; and
      receiving the selected content from the server and transferring the selected content to the selected client using a Digital Living Network Alliance (DLNA) Digital Media Controller (DMC),
   wherein the information on the one or more contents is determined by analyzing the received response message of the protocol or using an Application Program Interface (API) provided by the cloud service system.

2. The method of claim 1, further comprising:
   transmitting a Protocol Info message to the selected client; and
   receiving a response signal in response to the Protocol Info message from the selected client.

3. The method of claim 1, wherein the plurality of clients are connected to network comprising a Digital Living Network Alliance (DLNA).

4. The method of claim 1, wherein converting the format of the metadata of the selected content to the determined usable format comprises:

converting at least one of an Uniform Resource Identifier (URI), a type, a size, duration or a thumbnail URI of contents among the metadata.

5. The method of claim 1, further comprising:
converting a public Internet Protocol (IP) address to a private IP address, wherein the public IP address comprises an address on a web browser where the one or more contents are posted; and
transmitting a private IP Uniform Resource Identifier (URI) comprising the converted IP address and the converted metadata to the selected client.

6. The method of claim 1, wherein transferring the selected content comprises:
pushing the received content from the server so that streamed content is reproduced by the selected client.

7. The method of claim 1, wherein transferring the selected content comprises:
pulling the received content from the server so that streamed content is reproduced by the selected client.

8. An electronic apparatus connected to a plurality of clients on a cloud service system, the electronic apparatus comprises:
a protocol extractor configured to receive, from a server, metadata comprising information on one or more contents included in the server, wherein the protocol extractor is configured to:
determine a kind of a protocol provided by the server,
request the server to retrieve the protocol,
receive a response message of the protocol from the server, and
request the server to transmit the metadata comprising the information on the one or more contents included in the server;
a metadata generator configured to:
select, among the plurality of clients, a client which is to reproduce a selected content among the one or more contents;
in response to selecting the client, determining a usable format of the metadata by the selected client;
convert, to the determined usable format, a format of the received metadata of the selected content, wherein to convert the format of the received metadata of the selected content includes:
convert the format of the metadata of the selected content to the determined usable format; and
transmit, to the selected client, the metadata of the selected content with the converted format, the metadata being to be used to reproduce the selected content by the selected client; and
determine the information on the one or more contents by analyzing the received response message of the protocol or using an Application Program Interface (API) provided by the cloud service system; and
a Digital Living Network Alliance (DLNA) Digital Media Controller (DMC) configured to receive the selected content from the server and transfer the selected content to the selected client.

9. The electronic apparatus of claim 8, wherein the DLNA DMC is configured to transmit a Protocol Info message to the selected client and receive a response signal in response to the Protocol Info message from the selected client.

10. The electronic apparatus of claim 8, wherein a network comprises a Digital Living Network Alliance (DLNA).

11. The electronic apparatus of claim 8, wherein the metadata generator is configured to convert at least one of an Uniform Resource Identifier (URI), a type, a size, duration, or a thumbnail URI of contents among the metadata.

12. The electronic apparatus of claim 8, wherein the metadata generator is configured to:
convert a public Internet Protocol (IP) address to a private IP address, wherein the public IP address comprises an address on a web browser where the one or more contents are posted, and
transmit a private IP Uniform Resource Identifier (URI) comprising the converted IP address and the converted metadata to the selected client.

13. The electronic apparatus of claim 8, wherein the metadata generator is configured to push the received contents from the server so that streamed contents are reproduced by the selected client.

14. The electronic apparatus of claim 8, wherein the metadata generator is configured to pull the received contents from the server so that streamed contents are reproduced by the selected client.

* * * * *